United States Patent
Quek et al.

(10) Patent No.: US 9,967,664 B1
(45) Date of Patent: May 8, 2018

(54) SENSOR ASSEMBLY FOR MEASURING DIAPHRAGM DISPLACEMENT AND TEMPERATURE IN A MICRO SPEAKER

(71) Applicant: Apple Inc., Cupertino, CA (US)

(72) Inventors: Yang Boon Quek, San Jose, CA (US); Scott P. Porter, Inglewood, CA (US); Roderick B. Hogan, San Francisco, CA (US); Hongdan Tao, Campbell, CA (US); Suzanne C. Brown, San Jose, CA (US); Christopher Wilk, Los Gatos, CA (US); Nathan A. Johanningsmeier, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days. days.

(21) Appl. No.: 15/601,931

(22) Filed: May 22, 2017

(51) Int. Cl.
| | |
|---|---|
| *H04R 3/00* | (2006.01) |
| *H04R 23/00* | (2006.01) |
| *H04R 29/00* | (2006.01) |
| *H04R 9/02* | (2006.01) |
| *H04R 9/06* | (2006.01) |
| *G01S 17/08* | (2006.01) |
| *G01K 7/00* | (2006.01) |

(52) U.S. Cl.
CPC ............... *H04R 3/007* (2013.01); *G01K 7/00* (2013.01); *G01S 17/08* (2013.01); *H04R 9/025* (2013.01); *H04R 9/06* (2013.01); *H04R 23/008* (2013.01); *H04R 29/001* (2013.01)

(58) Field of Classification Search
None
See application file for complete search history.

(56) References Cited

U.S. PATENT DOCUMENTS

| | | | |
|---|---|---|---|
| 4,207,430 A | 6/1980 | Harada et al. | |
| 4,607,382 A * | 8/1986 | Dijkstra | H04R 1/42 381/392 |
| 4,868,401 A * | 9/1989 | Erickson | H04R 3/002 250/548 |
| 6,694,037 B1 * | 2/2004 | Robinson | H04R 7/18 381/398 |
| 7,418,109 B2 * | 8/2008 | Sakamoto | G06F 19/22 181/161 |
| 7,961,892 B2 | 6/2011 | Fedigan | |
| 8,204,269 B2 * | 6/2012 | Sahyoun | H04R 9/043 381/398 |

(Continued)

*Primary Examiner* — Paul Huber
(74) *Attorney, Agent, or Firm* — Womble Bond Dickinson (US) LLP

(57) ABSTRACT

A micro speaker assembly including a micro speaker having a top plate, a bottom plate parallel to the top plate, a magnet assembly coupled to one of the top plate or the bottom plate, a compliant member positioned between the magnet assembly and the top plate or the bottom plate, the compliant member operable to be displaced in response to an acoustic input, and a voice coil coupled to the compliant member. The assembly further including an optical sensor coupled to the micro speaker, the optical sensor having a light emitter and a light detector, the light emitter and the light detector being fixedly coupled to the top plate or the bottom plate, and the optical sensor being operable to produce a displacement signal corresponding to a displacement of the compliant member and a temperature signal corresponding to a temperature of the magnet assembly.

28 Claims, 11 Drawing Sheets

(56) References Cited

U.S. PATENT DOCUMENTS

| | | | |
|---|---|---|---|
| 8,264,171 B1 | 9/2012 | Domer | |
| 2007/0165896 A1* | 7/2007 | Miles | H04R 23/008 381/356 |
| 2015/0323456 A1* | 11/2015 | Agashe | H04R 1/04 356/445 |
| 2016/0007108 A1* | 1/2016 | Lee | H04R 1/08 381/111 |
| 2016/0007125 A1* | 1/2016 | Lee | H04R 31/003 381/172 |
| 2016/0057541 A1* | 2/2016 | Porter | H04R 9/025 381/412 |
| 2016/0094926 A1* | 3/2016 | Hosoda | H04R 23/008 381/59 |

* cited by examiner

SENSOR ASSEMBLY FOR MEASURING DIAPHRAGM DISPLACEMENT AND TEMPERATURE IN A MICRO SPEAKER

FIELD

An embodiment of the invention is directed to a transducer having an optical sensor for measuring characteristics of the transducer, more specifically, a micro speaker having a reflective optical proximity sensor for measuring diaphragm displacement and temperature. Other embodiments are also described and claimed.

BACKGROUND

In modern consumer electronics, audio capability is playing an increasingly larger role as improvements in digital audio signal processing and audio content delivery continue to happen. In this aspect, there is a wide range of consumer electronics devices that can benefit from improved audio performance. For instance, smart phones include, for example, electro-acoustic transducers such as speakerphone loudspeakers and earpiece receivers that can benefit from improved audio performance. Smart phones, however, do not have sufficient space to house much larger high fidelity sound output devices. This is also true for some portable personal computers such as laptop, notebook, and tablet computers, and, to a lesser extent, desktop personal computers with built-in speakers. Many of these devices use what are commonly referred to as "micro speakers." Micro speakers are a miniaturized version of a loudspeaker, which use a moving coil motor to drive sound output. The moving coil motor may include a diaphragm, voice coil and magnet assembly positioned within a frame. In addition, electrical connections to the voice coil typically consist of wires running from the voice coil to other stationary components. In some cases, it is desirable to measure and/or monitor micro speaker characteristics in real time for modeling and predicting speaker behavior. Due to the relatively compact nature of micro speakers, however, it is difficult to incorporate electronic components for measuring/monitoring into the speaker design.

SUMMARY

An embodiment of the invention is directed to a transducer having a sensor for measuring the displacement of a sound radiating or sound pick-up surface (e.g., a diaphragm) of the transducer. The sensor may further be operable to measure temperature within the transducer. For example, the transducer may be a micro speaker and the sensor may be a reflective optical sensor. The reflective optical sensor may be integrated within the micro speaker such that the micro speaker and the optical sensor are part of a single unit or module. For example, in one embodiment, the optical sensor may be mounted along one side of the micro speaker diaphragm and adjacent the micro speaker magnet, such that it can be used to detect displacement of the diaphragm and a core temperature of the magnet. The diaphragm displacement detection may be used for modeling and predicting a behavior of the micro speaker. For example, using the displacement data, the micro speaker's nonlinearities can be measured and compensated for, and displacement control algorithms can be implemented (e.g., to prevent crashing).

In addition, regarding temperature detection, the optical sensor may include a light emitter (e.g., a light emitting diode (LED)) and a light detector, that are placed within, for example a cavity, of the magnet. Due to the proximity of the LED to the magnet, the LED can be used for direct measurement of the magnet core temperature. In particular, it is recognized that the LED forward voltage (Vf) at a constant current decreases linearly as the junction temperature of the LED increases. In addition, it is understood that the junction temperature of the LED is a function of the ambient temperature surrounding the LED. In other words, a junction temperature of the LED can be understood to correspond to the temperature of the surrounding magnet. For example, as the magnet temperature increases, the junction temperature of the LED will further increase; this will, in turn, cause the LED forward voltage (Vf) to decrease. The forward voltage (Vf) of the LED may therefore be used to determine the magnet core temperature within the micro speaker. The magnet core temperature can be detected in real time and be used as a speaker protection system against magnet overheating (demagnetization). For example, these real time measurements can be used to dial down the power to the speaker (e.g., reduce voice coil signal voltages beyond a temperature threshold) to reduce the temperature of the magnet beyond its operational limit if the magnet gets too hot. In addition, the temperature measurement can be used as a design tool for material/magnet grade selection and to fix the magnet grade in the speaker design. For example, it is recognized that NdFeB magnets may be used in space-constrained micro speaker drivers because they are the strongest type of permanent magnet per volume. The base composition of neodymium (Nd), iron (Fe) and boron (B) may be combined with several other heavy rare earth elements, the main purpose of these being to add in a degree of temperature resistance to the material. The more of these heavy rare earth elements contained in the material composition, the higher the temperature that the magnet may be exposed to, before demagnetization of the material occurs. Heavy rare earth elements, however, are highly-energy-intensive to extract from the ore, have a limited number of deposits globally and are often collocated in the deposits with radioactive material such as uranium and thorium. Different grades of NdFeB material are therefore available, with different compositions for different temperature performance requirements. Thus, it is important to match the appropriate magnet grade with the transducer application, to reduce heavy rare earth element usage. The ability to detect the core temperature of the magnet and dial down the speaker power to prevent overheating as disclosed herein, therefore allows for the use/selection of a magnet grade with little to no heavy rare earth elements in the composition without over-heating.

Representatively, in one embodiment, the invention is directed to a micro speaker assembly including a micro speaker having a top plate, a bottom plate parallel to the top plate, a magnet assembly coupled to one of the top plate or the bottom plate, a compliant member positioned between the magnet assembly and the top plate or the bottom plate, the compliant member operable to be displaced in response to an acoustic input (e.g., an audio signal input), and a voice coil coupled to the compliant member. The assembly may further include an optical sensor coupled to the micro speaker, the optical sensor having a light emitter and a light detector, the light emitter and the light detector being fixedly coupled to the top plate or the bottom plate, and the optical sensor being operable to produce a displacement signal corresponding to a displacement of the compliant member and a temperature signal corresponding to a temperature of the magnet assembly. The light emitter may be operable to emit light in a direction of the compliant member and the light detector is operable to detect a light reflected from the compliant member to produce the displacement signal. The magnet assembly may include a cavity formed therein, and the light emitter and the light detector may be positioned within the cavity. In some embodiments, the magnet assembly, the light emitter and the light detector may be coupled to the bottom plate of the micro speaker. In other embodiments, the magnet assembly may be coupled to the bottom plate of the micro speaker, and the light emitter and the light detector may be coupled to the top plate of the micro speaker. In some cases, the optical sensor is operable to detect a displacement of the compliant member within a distance range corresponding to a linear response region of the optical sensor. The assembly may further include a circuit operable to process the displacement signal and the temperature signal output by the optical sensor. The displacement signal may correspond to an intensity of the light detected by the light detector, and the circuit may be operable to measure a displacement of the compliant member based on the intensity of the light detected. In some cases, the optical sensor is a first optical sensor and the displacement signal is a first displacement signal indicative of a displacement of a first portion of the compliant member, the assembly further comprising a second optical sensor, wherein the second optical sensor is operable to output a second displacement signal indicative of a displacement of a second portion of the compliant member, and the circuit may be further operable to detect a tilt of the compliant member based on the first displacement signal and the second displacement signal. In some embodiments, the temperature signal corresponds to a forward voltage signal of the light emitter, and the circuit is operable to measure a temperature of the magnet assembly based on the forward voltage signal. In addition, the circuit may be operable to modify a power input to the micro speaker based on the temperature of the magnet assembly to protect the micro speaker against overheating. Still further, the circuit may be operable to modify a power input to the optical sensor to compensate for a change in output of the optical sensor due to the temperature of the magnet assembly.

In other embodiments, the invention is directed to an electrodynamic speaker assembly including an electrodynamic speaker having a top plate, a bottom plate parallel to the top plate, a magnet assembly coupled to one of the top plate or the bottom plate, a diaphragm positioned between the magnet assembly and the top plate or the bottom plate, the diaphragm operable to be displaced in response to an acoustic input, and a voice coil coupled to the diaphragm. The assembly may further include an optical proximity sensor positioned within a cavity of the magnet assembly, the optical proximity sensor having a light emitting diode (LED) operable to emit a beam of electromagnetic radiation in a direction of the diaphragm and a light detector operable to detect a reflection of the beam of electromagnetic radiation from the diaphragm. The LED and the light detector may be fixedly positioned on the bottom plate such that they are on a same plane. The cavity of the magnet assembly may be within a center of the magnet assembly. In some cases, the optical proximity sensor is operable to detect a displacement of the diaphragm based on the reflection of the beam of electromagnetic radiation. In addition, the optical proximity sensor may be operable to detect a temperature of the magnet assembly. In still further embodiments, the optical proximity sensor is operable to detect a tilt of the diaphragm.

In other embodiments, the invention is directed to transducer assembly including a transducer having a magnet assembly, a compliant member suspended over the magnet assembly, the compliant member operable to be displaced in response to an acoustic input, and a voice coil coupled to the compliant member. The assembly may further include a reflective optical sensor coupled to the micro speaker, the reflective optical sensor operable to (1) detect a displacement of the compliant member by detecting a light reflected off of the compliant member and produce a corresponding displacement signal, and (2) detect a temperature of the magnet assembly and produce a corresponding temperature signal. Finally, the assembly may include a circuit operable to receive the displacement signal and the temperature signal, and measure the displacement of the compliant member and the temperature of the magnet assembly. The reflective optical sensor may include a light emitter and a light detector, and wherein the light emitter emits a beam of electromagnetic radiation toward the compliant member and the light detector detects a reflection of the beam off of the compliant member to produce the displacement signal. In other embodiments, the reflective optical sensor may include a light emitter and a light detector, and the light emitter and the light detector may be positioned along a surface of the transducer that is parallel to the compliant member. The reflective optical sensor may be operable to detect a displacement of the compliant member within a distance range of 2 mm or less from the optical sensor. The reflective optical sensor may include a light emitting diode (LED) and a light detector positioned within a cavity of the magnet assembly. In addition, the reflective optical sensor may include a light emitting diode (LED), and the circuit measures the temperature of the magnet assembly based on a forward voltage signal of the LED. The circuit may further be operable to determine when the temperature of the magnet assembly is above a predetermined threshold temperature and modify a power to the transducer. In addition, the circuit may be operable to determine the temperature of the magnet assembly and modify a power to the reflective optical sensor (e.g., adjust an LED current) to compensate for a change in output of the optical sensor due to the temperature of the magnet assembly. The circuit may also be operable to detect a tilt of the compliant member based on the measured displacement of the compliant member. In some cases, the transducer is a micro speaker and the compliant member has a maximum displacement distance of 2 mm or less.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments of this invention with reference to the appended drawings. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known structures and techniques have not been shown in detail so as not to obscure the understanding of this description.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
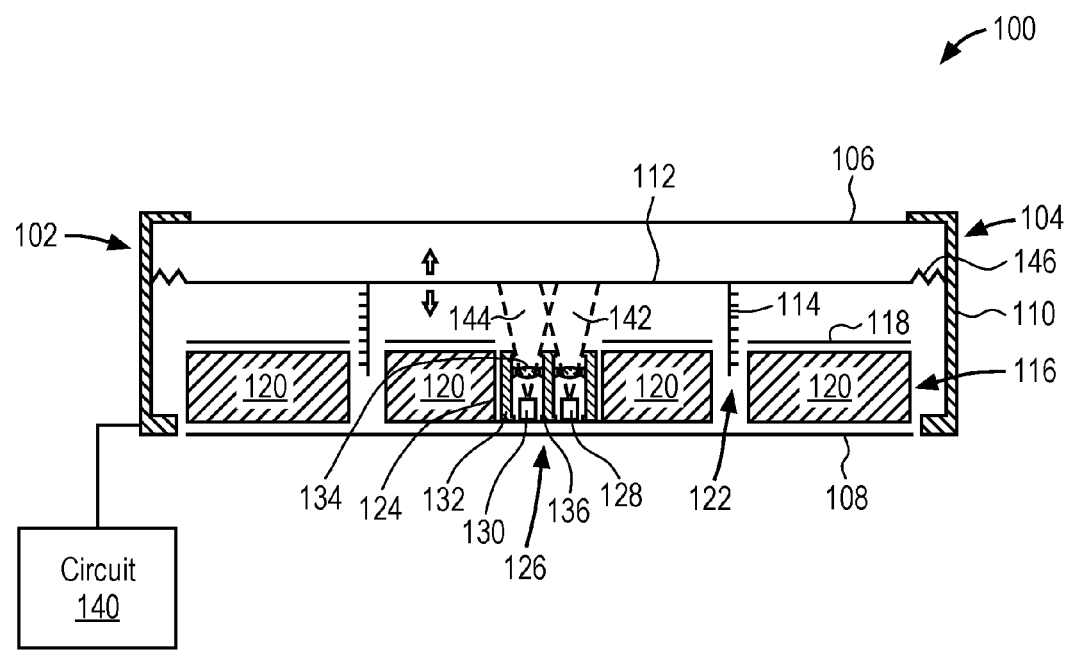
FIG. 1 illustrates a cross-sectional side view of one embodiment of a transducer assembly.

FIG. 1 illustrates a cross-sectional side view of one embodiment of a transducer assembly. Transducer assembly 100 may include a transducer 102 and an optical sensor 126. Transducer 102 may, in one embodiment, be an electric-to-acoustic transducer that converts an electrical audio signal input to the transducer to sound. For example, transducer 102 may be an electrodynamic speaker, for example, a micro speaker, and include various micro speaker components. The term "micro speaker" as used herein may refer to a relatively compact speaker assembly, for example, a 10 mm to 75 mm driver, or 10 mm to 20 mm driver (as measured along the diameter or longest length dimension), and which may have a maximum diaphragm excursion (e.g., range of movement) of, for example, 2 millimeters (mm) or less.

Transducer 102 may include an enclosure 104 that defines an interior chamber within which the various transducer (e.g., micro speaker) components are positioned, or otherwise associated with. Enclosure 104 may have a top side 106, a bottom side 108 and a support member 110 connecting the top side 106 to the bottom side 108. In some embodiments, each of the top side 106 and the bottom side 108 may be substantially planar members, for example, plate like members, which are substantially parallel to one another. Support member 110 may be a vertically oriented member (e.g., a side wall) that is connected to, and supports, top side 106 and bottom side 108. In addition, although not shown, at least one acoustic port may be formed through one of the top side 106, bottom side 108 or support member 110 of enclosure 104 to allow for output of sound from transducer 102 to the ambient environment.

Transducer 102 may further include, within enclosure 104, a compliant member 112, a voice coil 114 and a magnet assembly 116. Compliant member 112 may, for example, be any type of sound radiating surface that vibrates in response to an electrical audio signal input to output a sound to an ambient environment surrounding enclosure 104. For example, compliant member 112 may be a membrane, plate, diaphragm or other similar structure used in a speaker assembly to output sound. Compliant member 112 may be a substantially flat or planar structure as shown, such that it is substantially parallel to top side 106 and/or bottom side 108. It is contemplated, however, that in other embodiments, compliant member 112 may have other configurations, for example, the member may have a dome shape, or a portion (e.g., a center portion) that is outside a plane of the rest of the member, for example, an out-of-plane region of any shape and size. Compliant member 112 may be suspended from support member 110 by suspension member 146. Suspension member 146 may be a relatively compliant member, for example, more compliant than compliant member 112. Suspension member 146 may therefore allow compliant member 112 to move (e.g., vibrate) in a pistonic like manner (e.g., in a vertical direction parallel to vertical support member 110 as illustrated by the arrows) relative to the fixed support member 110.

Voice coil 114 may further be attached to, or otherwise suspended from, compliant member 112. The coil(s) of wire making up voice coil 114 may be directly attached to compliant member 112, or wound around a bobbin, which is directly attached to compliant member 112. The compliant member 112 and associated voice coil 114 may be positioned over, or otherwise suspended above, magnet assembly 116. Although not shown, power (e.g., a voice coil signal or current) may be supplied to voice coil 114 by wires (not shown) to produce a magnetic field and help drive movement of the voice coil 114, and in turn compliant member 112.

Magnet assembly 116 may include a top plate 118, a magnet 120 and a yoke, which in some embodiments, may also form the bottom side 108 of enclosure 104. Magnet 120 may be a permanent magnet that produces a magnetic field, and may further define a gap 122, within which voice coil 114 may be suspended. The stationary magnetic field of the magnet assembly 116 and the moving voice coil 114 produce a force that, in turn, drives movement of voice coil 114 and the associated compliant member 112.

Figure 2:
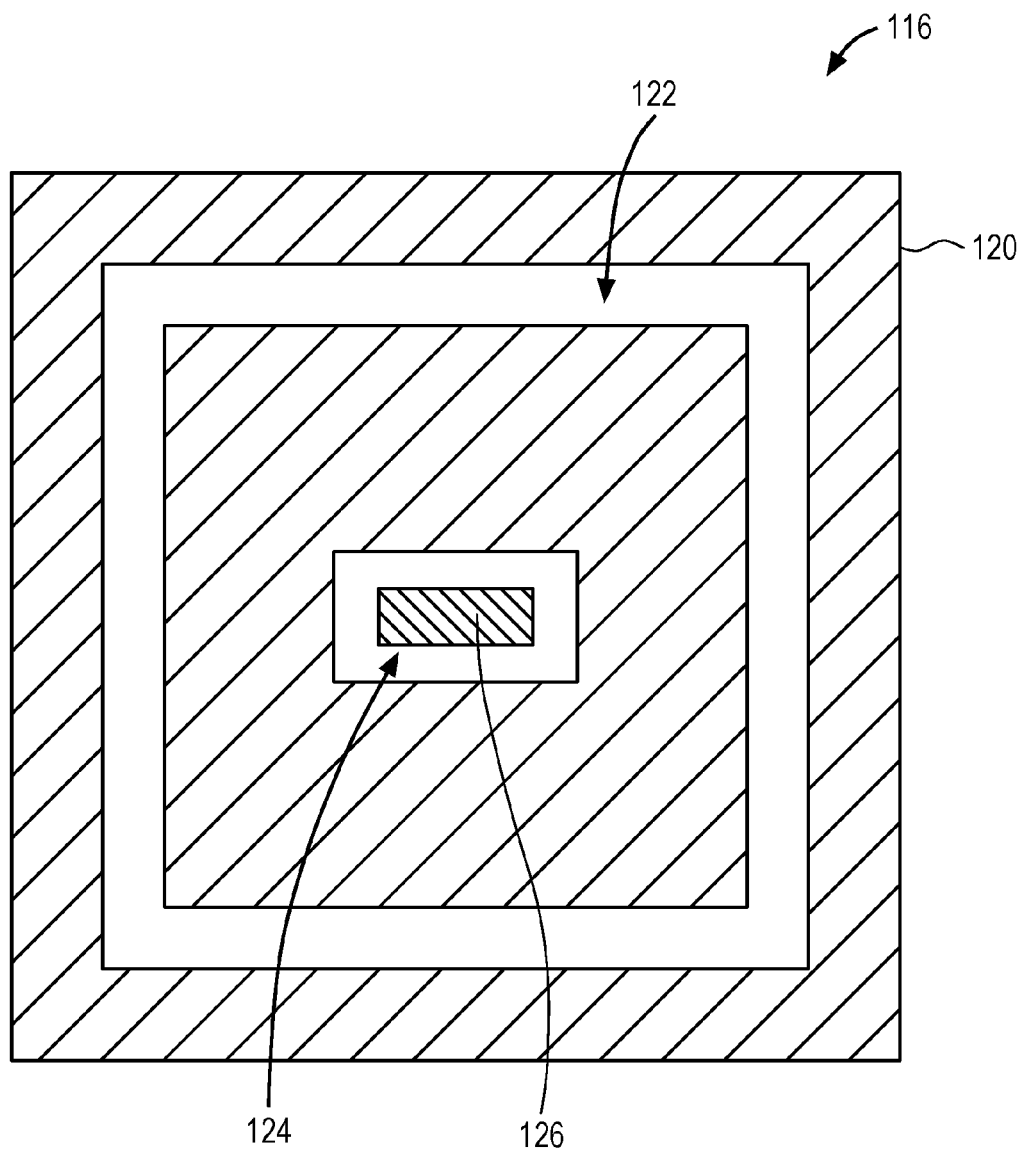
FIG. 2 illustrates a top plan view of a magnet assembly of the transducer assembly of FIG. 1.

In addition to gap 122 being formed within magnet assembly 116, magnet assembly 116 may further include a cavity 124, within which optical sensor 126 can be positioned. For example, as can be seen more clearly from FIG. 2, which shows a top view of magnet assembly 116, magnet assembly 116 includes gap 122 (to accommodate voice coil 114 as shown in FIG. 1) and further includes cavity 124 formed within a center region of magnet 120. For example, cavity 124 may be formed entirely inward, or radially inward to, the gap 122. Optical sensor 126 is then positioned within cavity 124 such that it is adjacent to, or within, magnet 120 of magnet assembly 116. The proximity of optical sensor 126 to compliant member 112 and magnet assembly 116 allows for optical sensor 126 to be used to measure a displacement of compliant member 112 and a temperature of magnet assembly 116, as will be described in more detail with respect to FIG. 5 to FIG. 9.

Returning now to FIG. 1, various aspects of optical sensor 126 will be described in more detail. In particular, optical sensor 126 may be any type of optical sensor suitable for detecting a displacement of compliant member 112 and a temperature of magnet assembly 116. For example, optical sensor 126 may be a reflective optical sensor, more specifically a reflective optical proximity sensor that can detect movement or displacement of compliant member 112 based on an intensity of a light reflected from compliant member 112 to optical sensor 126. Representatively, optical sensor 126 may include a light emitter 128 and a light detector 130 that are positioned within cavity 124 and face compliant member 112. The light emitter 128 may be any type of light emitting device suitable for emitting a light toward compliant member 112, and being detected by light detector 130. For example, light emitter 128 may be a light emitting diode (LED) that emits light in the form of a beam of electromagnetic radiation (e.g., infrared) toward compliant member 112. It is further noted, that in some embodiments, a light other than a laser light is emitted by the light emitter 128. This emitted light is then reflected by compliant member 112 back toward light detector 130 and is detected by light detector 130. Light detector 130 may, for example, be a photodiode sensor suitable for detecting the light reflected from compliant member 112. A signal (e.g. a displacement signal) representing the intensity of the light detected by light detector 130 (e.g., the intensity of the photons reflected back) may then be produced and output by optical sensor 126 to an associated processing or control circuit (e.g., an application specific integrated circuit (ASIC)) for measurement of a displacement of compliant member 112. In addition, since the LED is adjacent magnet assembly 116, a forward voltage (Vf) of light emitter 128 may further be used by circuit 140 (or another circuit) to determine a core temperature of magnet assembly 116. The processing operations for detecting and measuring the displacement and temperature characteristics of transducer assembly 100 will be described in more detail in reference to FIG. 5 to FIG. 6.

In addition, in some embodiments, optical sensor 126 may further include a frame 132 that includes separate compartments that contain light emitter 128 and light detector 130 to prevent unintended crosstalk, or other interference, between the two. In addition, one or more of an optical element(s) 134 may be mounted to frame 132 to control the output and/or input of the light from/to light emitter 128 and light detector 130, respectively. For example, the optical element(s) 134 may be lenses which concentrate (e.g., collimate) the light into an emitting cone 142 and a receiving cone 144, as shown, to facilitate detection. Regardless of the specific components of optical sensor 126, it should be recognized that the entire optical sensor 126, including light emitter 128 and light detector 130, are positioned along a same side of compliant member 112. For example, light emitter 128 and light detector 130 may be mounted within the cavity 124 of magnet assembly 116 such that they are within substantially the same plane, or mounted on a surface 136 of the transducer assembly 100 that is substantially planar and parallel to top side 106, bottom side 108 or compliant member 112. In other words, optical sensor 126 may be positioned below compliant member 112 and along a surface 136 parallel to compliant member 112 such that the light output by light emitter 128 is directed toward a bottom side of compliant member 112. The light emitted from light emitter 128 can then be reflected off of the bottom side of compliant member 112 back to light detector 130 for detection. In this aspect, optical sensor 126 is considered a reflective sensor, in contrast to a transmissive sensor in which light is detected by the light detector without reflection.

Figure 3:
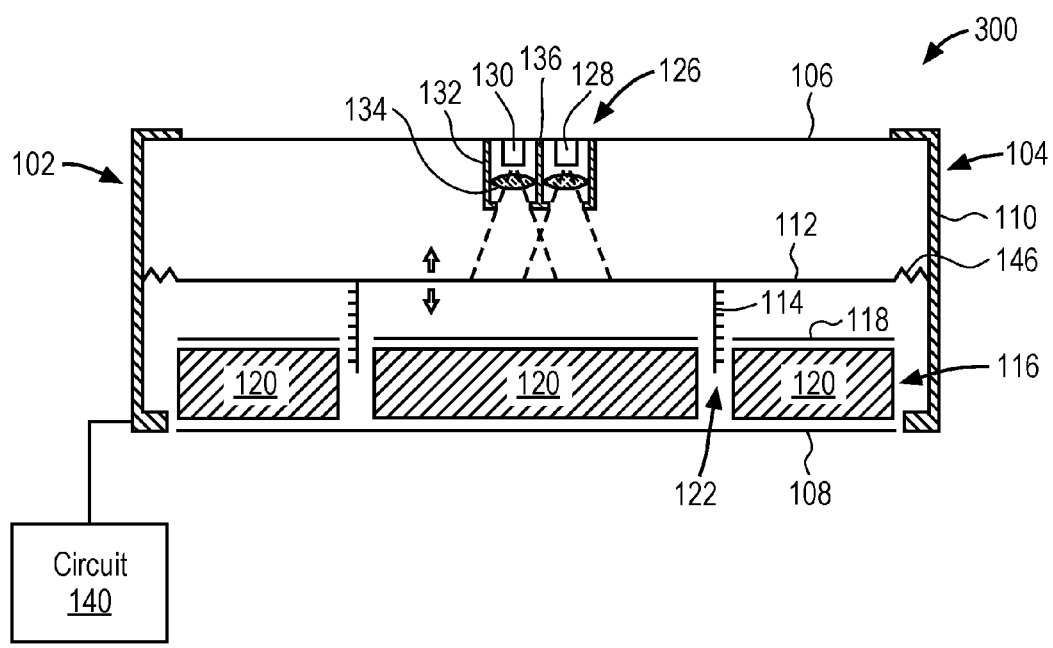
FIG. 3 illustrates a cross-sectional side view of another embodiment of a transducer assembly.

Optical sensor 126 may, however, in other embodiments be positioned along a top side 106 of the transducer assembly enclosure 104 such that it emits light in a downward direction. FIG. 3 illustrates a cross-sectional side view of one embodiment of a transducer assembly having an optical sensor positioned along its top side. Representatively, transducer assembly 300 of FIG. 3 is substantially the same as transducer assembly 100 of FIG. 1, except in this embodiment, optical sensor 126 is positioned along top side 106 of enclosure 104. In this aspect, light emitter 128 emits light in a downward direction, toward compliant member 112, and the light is reflected in an upward direction back toward light detector 130. Magnet assembly 116 may still be positioned along bottom side 108 of transducer assembly 300 (e.g., a side of compliant member 112 opposite top side 106). In this embodiment, cavity 124 may be omitted since optical sensor 126 is no longer positioned within magnet assembly 116. It is contemplated, however, that although optical sensor 126 is not within a cavity of magnet assembly 116, it is still close enough to magnet assembly 116 to detect a thermal output of magnet assembly 116, and in turn, be used to detect and measure a temperature of magnet assembly 116.

Figure 4:
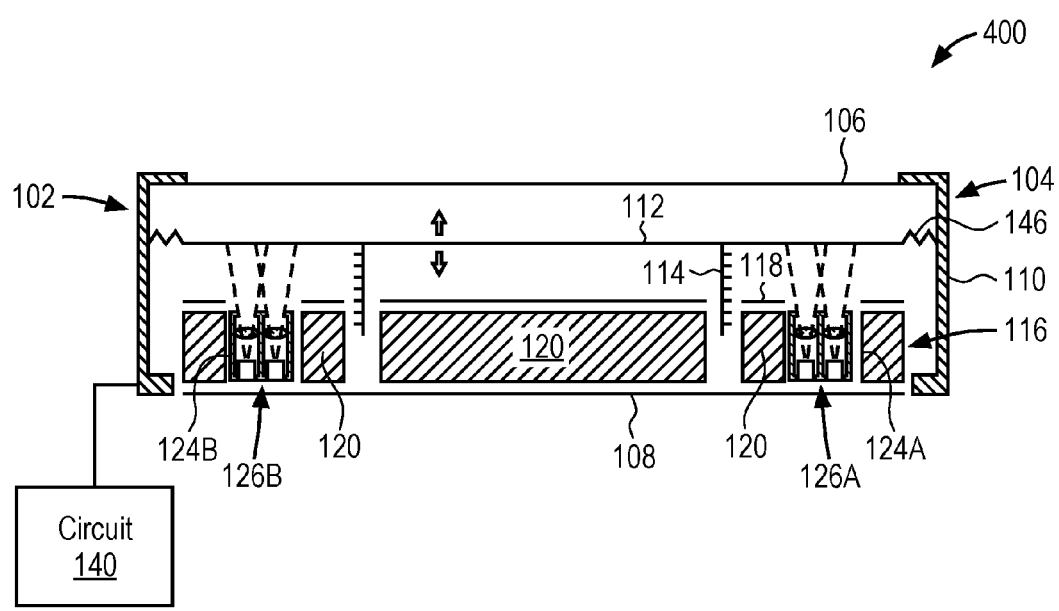
FIG. 4 illustrates a cross-sectional side view of another embodiment of a transducer assembly.

In addition, in still further embodiments, two optical sensors may be included within the transducer assembly to detect tilt of the compliant member. Representatively, FIG. 4 illustrates a cross-sectional side view of a transducer assembly 400, which is substantially the same as transducer assembly 100, except in this embodiment, two optical sensors are positioned within the enclosure. Representatively, similar to transducer assembly 100, transducer assembly 400 includes transducer 102 having compliant member 112, voice coil 114 and magnet assembly 116. In this embodiment, however, a first optical sensor 126A is positioned within a first cavity 124A of magnet assembly 116 and a second optical sensor 126B is positioned within a second cavity 124B of magnet assembly 116. The first optical sensor 126A and second optical sensor 126B are substantially the same as optical sensor 126 previously discussed in reference to FIG. 1, except that instead of being positioned at the center of compliant member 112, they are positioned near ends of compliant member 112. In this aspect, first optical sensor 126A can be used to detect a displacement of one end of compliant member 112 while second optical sensor 126B can be used to detect a displacement of another end of compliant member 112. Any discrepancy in the displacement at each end of compliant member 112 can be determined by comparing a displacement signal produced by first optical sensor 126A and a displacement signal produced by second optical sensor 126B, and used as a measure of compliant member tilt. This comparison, including the degree of tilt and tilt measurement, can be processed and determined by the associated circuit 140.

Figure 5:
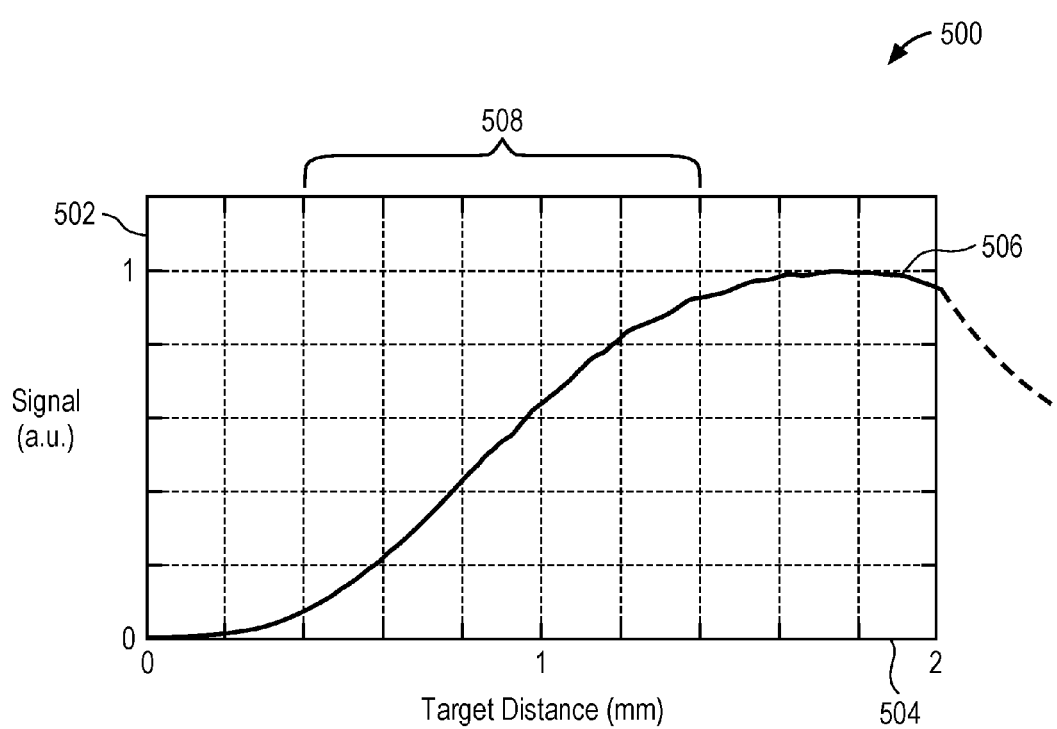
FIG. 5 is a graph illustrating a short distance response region for measuring displacement using the optical sensor disclosed herein.

It should be understood that in each of transducer assembly 100, 300 and 400 illustrated in FIGS. 1, 3 and 4, respectively, optical sensor 126 (and optical sensors 126A, 126B) are positioned in close proximity to compliant member 112 and operate within a relatively short distance range. In other words, optical sensor 126 operates within a shorter distance range than that of a conventional optical proximity sensor. Representatively, FIG. 5 is a graph illustrating a short distance response region for measuring displacement using the optical sensor as disclosed herein. In particular, as can be seen from graph 500, in which the optical sensor signal is represented by the y-axis 502 and a target distance (e.g., distance between the sensor and compliant member) is represented by the x-axis 504, the linear response region 508 of curve 506 is the region before the maximum signal point (e.g., to the right of region 508). For example, the linear response region 508 may correspond to a short distance range of about 2 millimeters (mm) or less, or from about 0.2 mm to about 1.6 mm, or from about 0.3 mm to about 1.5 mm. In other words, a distance between the target (e.g., compliant member 112) and the optical sensor (e.g. optical sensor 126) is about 2 mm or less. In this very short range, more light gets reflected from the compliant member as displacement of the compliant member increases. This, in turn, results in increased photocurrent. This short distance range response region (e.g., region before maximum signal point in FIG. 5) can therefore, with proper calibration and curve fitting techniques, be used to measure the displacement of the compliant member accurately with ultra close proximity distance measurements.

Figure 6:
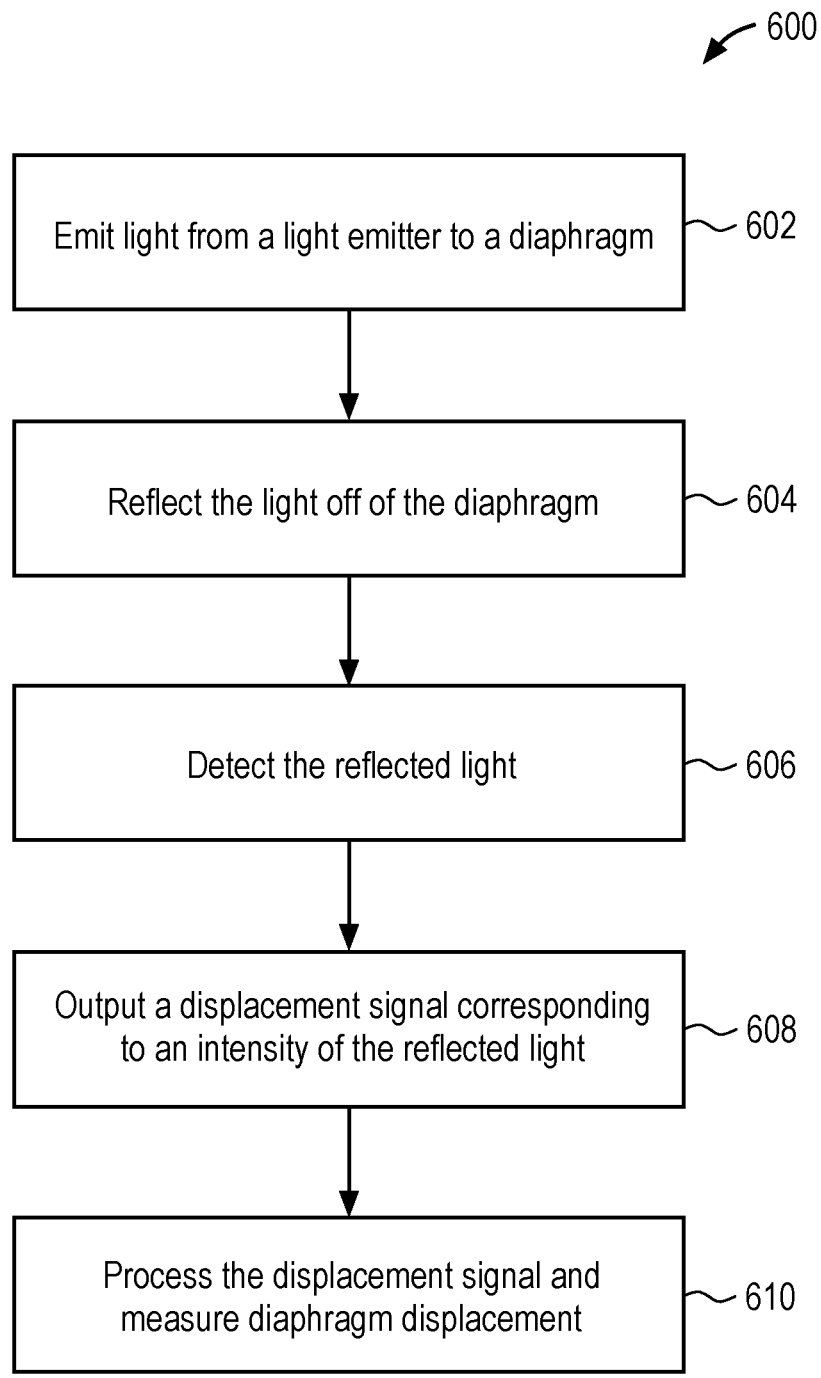
FIG. 6 illustrates one exemplary process for measuring diaphragm displacement using an optical sensor.

FIG. 6 illustrates one exemplary process for measuring diaphragm displacement using optical sensor 126. Representatively, process 600 may include emitting light (e.g., a beam of IR radiation) from a light emitter (e.g., light emitter 128) to a transducer diaphragm or compliant member (e.g., compliant member 112) (block 602). The diaphragm may be of a suitable material or structure to allow for reflection of the light back to a light detector (e.g., light detector 130) (block 604). For example, the diaphragm may have a lambertian surface that allows for diffuse reflection of the light back to the light detector. The reflected light may then be detected by the light detector (block 606). The light detector may, in turn, output a displacement signal corresponding to an intensity of the reflected light (block 608). For example, the displacement signal may correspond to a quantity of photons reflected back on the light detector. In some embodiments, the intensity of the reflected light (or number of photons reflected), will increase as diaphragm displacement increases due to greater overlap between the emitted light (e.g., light within light emitting cone 142) and reflected light (e.g., light within light receiving cone 144) within the short distance range. The displacement signal may then be processed and measured to determine diaphragm displacement (block 610). For example, the displacement signal may be output to a control circuit (e.g., an ASIC) for signal processing. The diaphragm displacement measurement may be used for modeling and predicting a behavior of the micro speaker. For example, using the displacement data, the micro speaker's nonlinearities may be measured and compensated for, and displacement control algorithms can be implemented (e.g., to prevent crashing).

Figure 7:
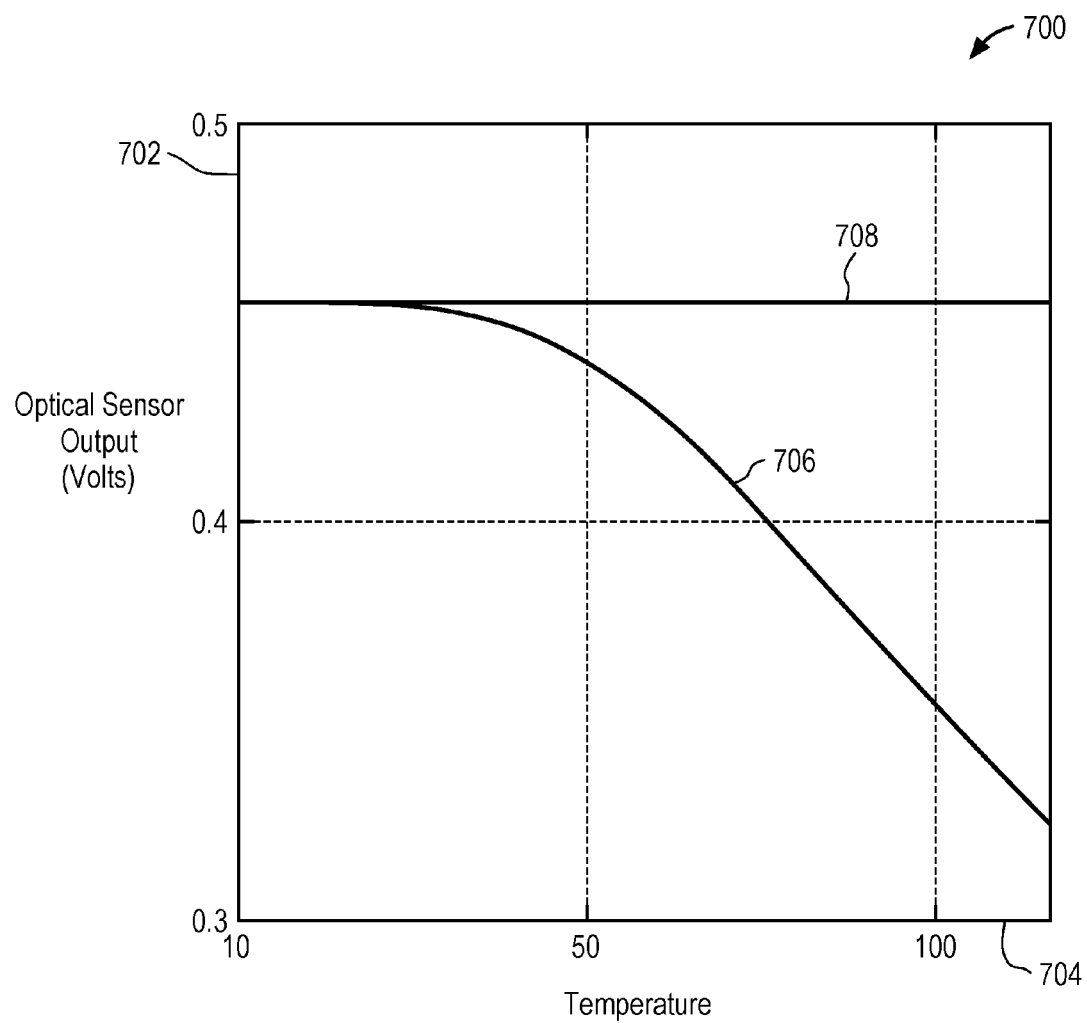
FIG. 7 illustrates one exemplary embodiment of a graph comparing a photosystem output with and without temperature compensation.

In addition, it is recognized that changes in temperature within any of the transducer assembly embodiments disclosed herein, may impact, for example, the accuracy of the displacement measurement and/or transducer performance. Therefore, by further using the optical sensor to detect a temperature (or temperature changes), it is possible to compensate for, and possibly prevent, any error caused by these temperature changes resulting in improved accuracy in displacement detection and/or transducer performance. For example, as temperature increases (e.g., the magnet heats up), the LED and/or photodiode output may drop, or otherwise decrease. This, in turn, may cause some error drift in displacement measurements. This error, however, can be reduced by adjusting LED currents so that the optical sensor (or photosystem) output remains constant regardless of temperature. FIG. 7 illustrates one exemplary embodiment of a graph comparing a photosystem output with and without temperature compensation. In particular, in graph 700, the photosystem output (Volts) is illustrated by the y-axis 702, and temperature is illustrated by the x-axis 704. Curve 706 illustrates the photosystem output without temperature compensation. As can be seen from curve 706, as temperature increases, the photosystem output decreases or drops. Curve 708, on the other hand, illustrates the photosystem output with temperature compensation as disclosed herein. As can be seen from curve 708, when, for example LED current is adjusted (e.g., increased), the photosystem output remains relatively constant as temperature increases. This, in turn, allows for more accurate displacement measurement.

In one embodiment, the temperature that is measured may be the magnet assembly core temperature. In this embodiment, the optical sensor, and more specifically the optical sensor LED is near the magnet, therefore a thermal output of the magnet will impact (e.g., increase or decrease) a junction temperature of the LED. In turn, it is recognized that the LED forward voltage (Vf) (at a constant current) decreases linearly as the junction temperature of the LED increases. Therefore, the forward voltage (Vf) of the optical sensor LED can be used to determine the temperature of the magnet. Then, using this information, a compensation algorithm can be applied. For example, in one embodiment, an algorithm with multiple sets of fitting coefficients can be used (e.g. keeping the LED current constant) or an LED current compensation algorithm can be used (e.g., keeping the fitting coefficients constant). In one embodiment, the algorithm may have one coefficient for a threshold temperature of 20 degrees or more (e.g., from 20 degrees to 30 degrees), a second coefficient for a threshold temperature of 30 degrees or more (e.g., from 30 degrees to 40 degrees), and a third coefficient for a threshold temperature of 40 degrees or more (e.g., from 40 degrees to 50 degrees). In another embodiment, when the temperature changes, the LED current can be adjusted accordingly (e.g., LED current increased) to compensate for what would otherwise caused a reduced signal in photosystem output, and in turn, inaccuracy in displacement measurement. It should further be understood that while in one embodiment, the algorithm may include multiple calibrations for various temperature ranges, in other embodiments, the algorithm may take into account varying LED currents and ensure a same photodiode output at varying temperature (using Vf) at a displacement (without multiple calibrations and/or coefficients).

Figure 8:
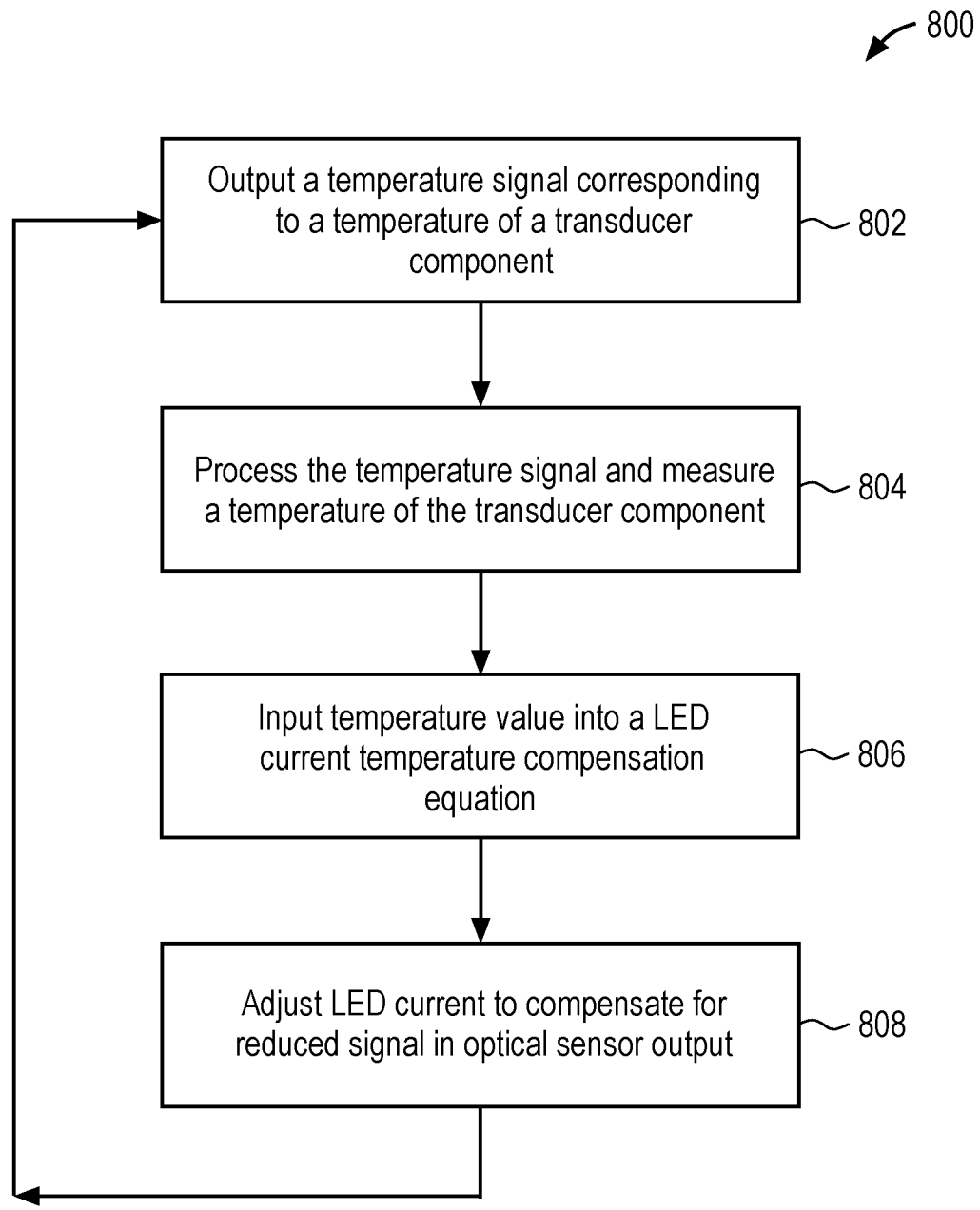
FIG. 8 illustrates one exemplary process for compensating an optical sensor output in response to temperature changes.

FIG. 8 illustrates one exemplary process for compensating an optical sensor output in response to temperature changes. Representatively, in one embodiment, process 800 includes outputting a temperature signal corresponding to a temperature of a transducer component (block 802). For example, the temperature signal may be a forward voltage (Vf) of the optical sensor LED (e.g., light emitter 128) and the transducer component may be the magnet assembly (e.g., magnet assembly 116). The temperature signal may then be processed and a temperature of the transducer component measured (block 804), for example, by a control circuit (e.g., an ASIC). The measured temperature may then be input to an LED current temperature compensation equation (block 806). The LED current may then be adjusted accordingly to compensate for reduced signal in optical sensor output (block 806). The process 800 may be a continuous loop such that it returns back to operation 802 upon completion of operation 808.

Figure 9:
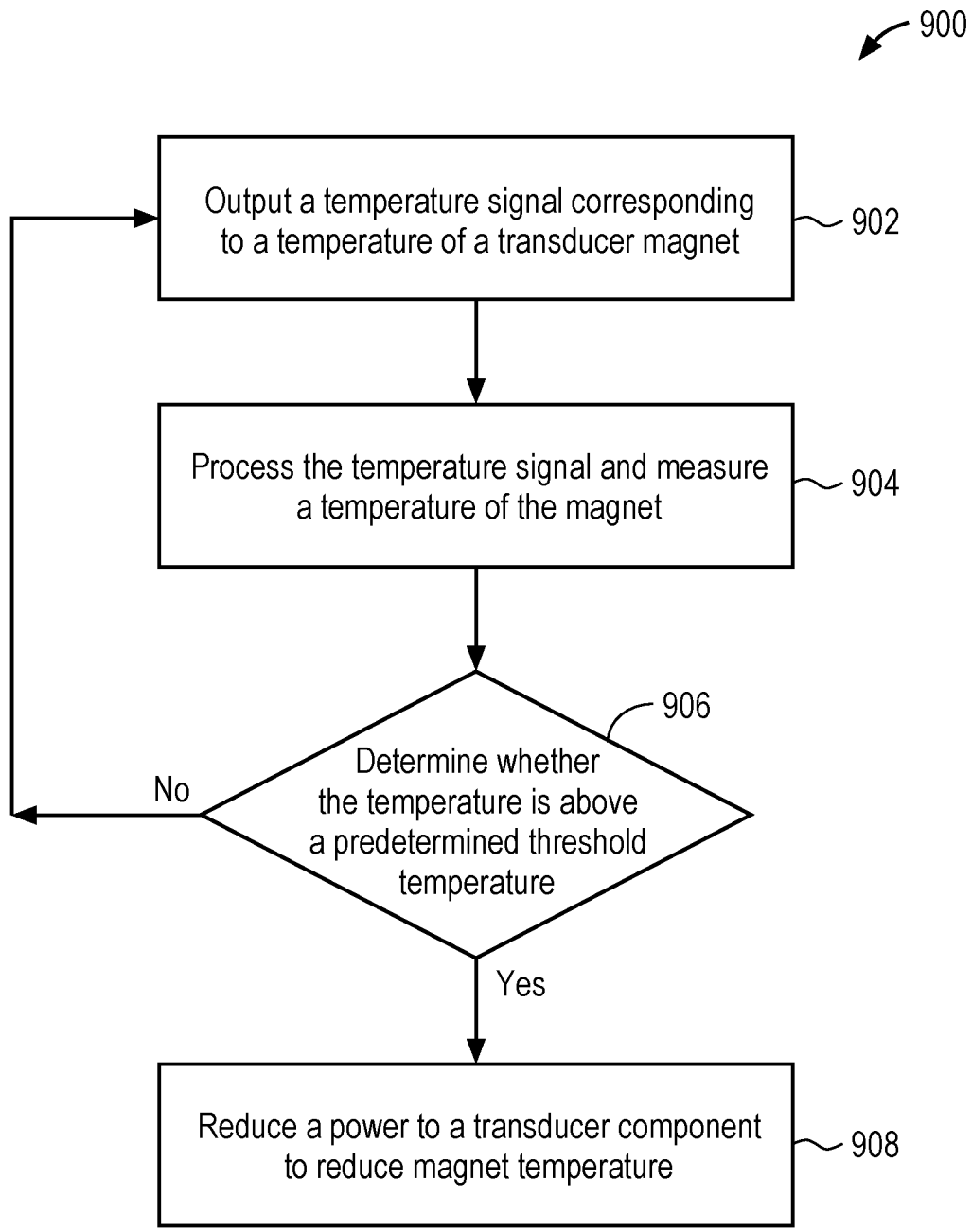
FIG. 9 illustrates one exemplary process for controlling a magnet temperature in response to a temperature increase.

Moreover, in addition to using the temperature measurement to improve accuracy of the displacement measurement, the temperature measurement can be used to protect the transducer assembly. For example, the temperature measurement can be used to protect against magnet over-heating (demagnetization). For example, as previously discussed, these real time measurements can be used to reduce the power to the speaker (e.g., reduce voice coil signal voltages), and in turn, reduce the temperature of the magnet. FIG. 9 illustrates one exemplary process for controlling a magnet temperature in response to a temperature increase. Representatively, in one embodiment, process 900 includes outputting a temperature signal corresponding to a temperature of a magnet assembly (e.g., magnet assembly 116) within a transducer (e.g., transducer 102) (block 902). For example, the temperature signal may be a forward voltage (Vf) of the optical sensor LED (e.g., light emitter 128) as previously discussed. The temperature signal may then be processed and a temperature of the magnet assembly measured (block 904). For example, the temperature may be processed and measured by a control circuit (e.g., an ASIC). The measured temperature may then be compared to a predetermined threshold temperature to determine whether it is above the threshold temperature (block 906). For example, the threshold temperature(s) may be a temperature (or temperature range) which corresponds to a temperature, or a number of temperatures, which are known to compromise the magnet operation (e.g., cause magnet over heating). When the temperature is found to be above this threshold temperature(s), a temperature of the magnet may be adjusted, for example, reduced by reducing a power to a transducer component to reduce magnet temperature (block 908). The transducer component may, for example, be a voice coil (e.g., voice coil 114) that may contribute to the increase in magnet temperature. In addition, in some embodiments, where the temperature is not above the predetermined threshold temperature (or range) the process may proceed back to operation 902.

In addition, since the magnet temperature can be controlled in real time, a magnet assembly with lower operational limits (e.g., a magnet grade with little to no heavy rare earth elements in the composition) can be selected. In this aspect, the temperature measurement can be used as a design tool for material/magnet grade selection and to fix the magnet grade in the speaker design. For example, it is recognized that NdFeB magnets may be used in space-constrained micro speaker drivers because they are the strongest type of permanent magnet per volume. The base composition of neodymium (Nd), iron (Fe) and boron (B) may be combined with several other heavy rare earth elements, the main purpose of these being to add in a degree of temperature resistance to the material. The more of these heavy rare earth elements contained in the material composition, the higher the temperature that the magnet may be exposed to, before demagnetization of the material occurs. Heavy rare earth elements, however, are highly-energy-intensive to extract from the ore, have a limited number of deposits globally and are often collocated in the deposits with radioactive material such as uranium and thorium. Different grades of NdFeB material are therefore available, with difference compositions for different temperature performance requirements. Thus, it is important to match the appropriate magnet grade with the transducer application, to reduce heavy rare earth element usage. The ability to detect the core temperature of the magnet and dial down the speaker power to prevent overheating as disclosed herein, therefore allows for the use/selection of a magnet grade with little to no heavy rare earth elements in the composition may be used without over-heating.

Figure 10:
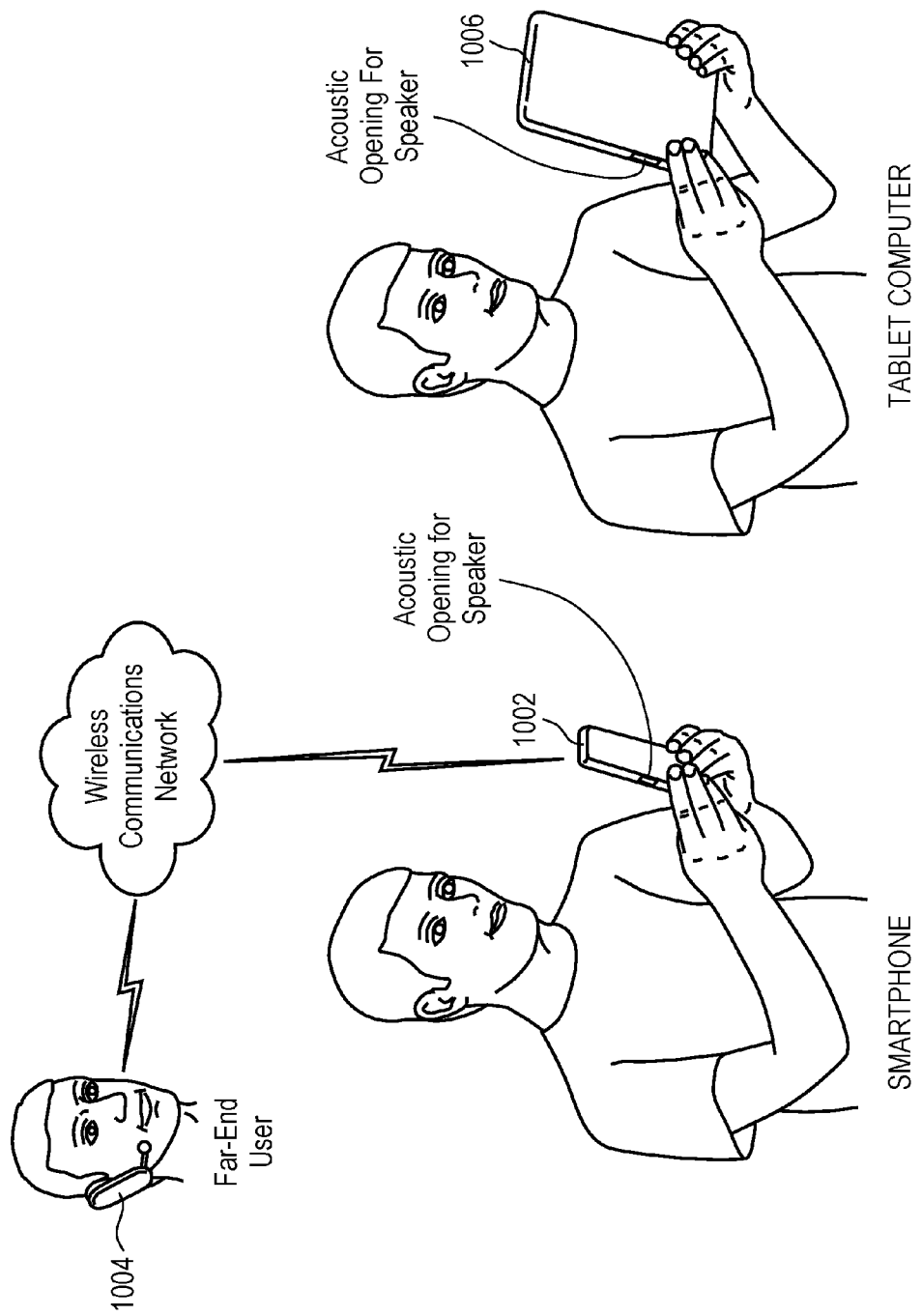
FIG. 10 illustrates one embodiment of a simplified schematic view of one embodiment of an electronic device in which the transducer assembly may be implemented.

FIG. 10 illustrates one embodiment of a simplified schematic view of one embodiment of an electronic device in which a micro speaker, or other transducer device described herein, may be implemented. As seen in FIG. 10, the micro speaker may be integrated within a consumer electronic device 1002 such as a smart phone with which a user can conduct a call with a far-end user of a communications device 1004 over a wireless communications network; in another example, the micro speaker may be integrated within the housing of a tablet computer 1006. These are just two examples of where the micro speaker device described herein may be used; it is contemplated, however, that the micro speaker may be used with any type of electronic device in which a MEMS device, for example, an optical MEMS microphone, is desired, for example, a tablet computer, a desk top computing device or other display device.

Figure 11:
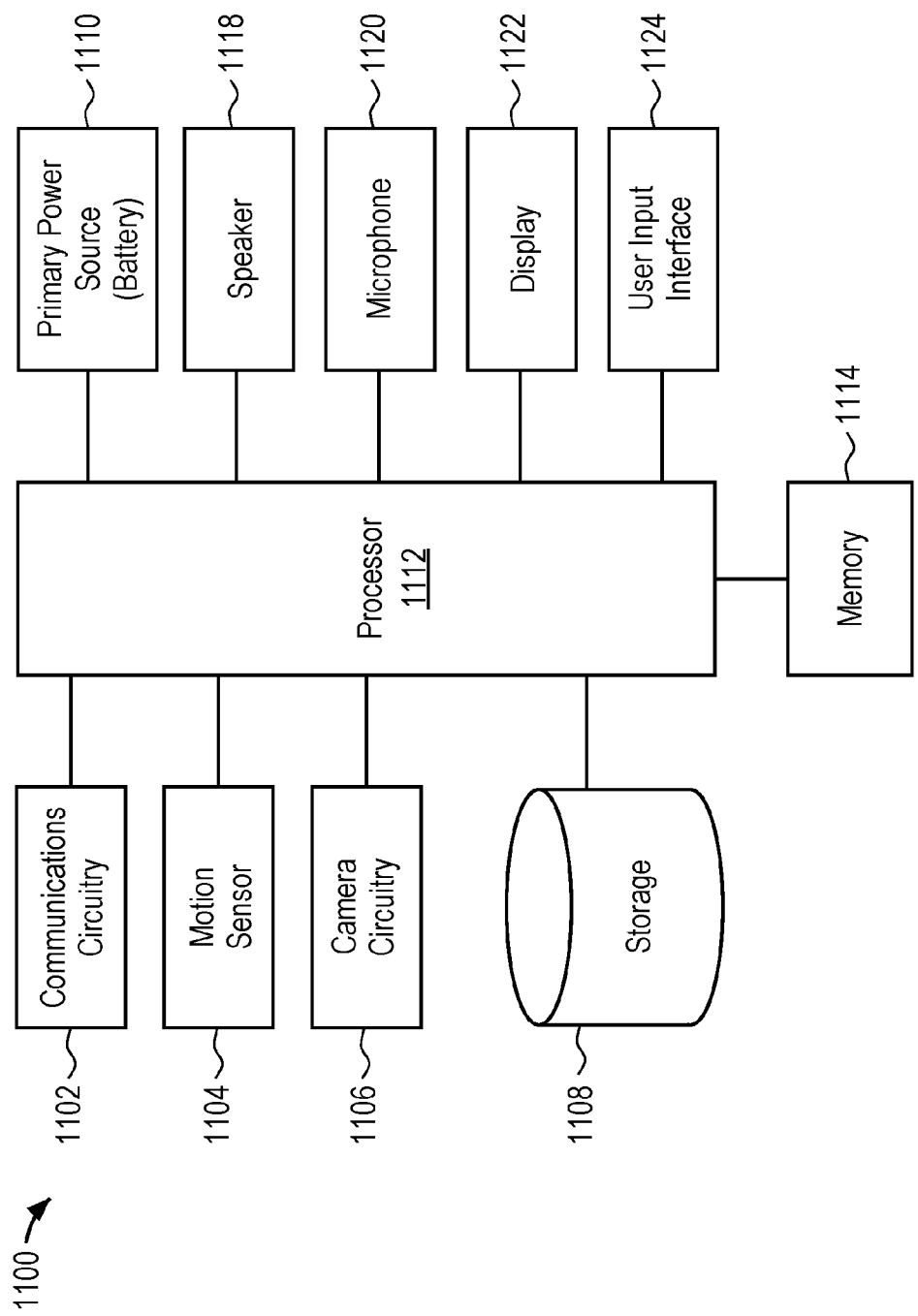
FIG. 11 illustrates a block diagram of some of the constituent components of an embodiment of an electronic device in which an embodiment of the invention may be implemented.

FIG. 11 illustrates a block diagram of some of the constituent components of an embodiment of an electronic device in which an embodiment of the invention may be implemented. Device 1100 may be any one of several different types of consumer electronic devices, for example, such as those discussed in reference to FIG. 10. For example, the device 1100 may be any microphone-equipped mobile device, such as a cellular phone, a smart phone, a media player, or a tablet-like portable computer.

In this aspect, electronic device 1100 includes a processor 1112 that interacts with camera circuitry 1106, motion sensor 1104, storage 1108, memory 1114, display 1122, and user input interface 1124. Main processor 1112 may also interact with communications circuitry 1102, primary power source 1110, speaker 1118, and microphone 1120. Speaker 1118 may be a micro speaker assembly, for example, a micro speaker assembly such as that described in reference to FIG. 1. The various components of the electronic device 1100 may be digitally interconnected and used or managed by a software stack being executed by the processor 1112. Many of the components shown or described here may be implemented as one or more dedicated hardware units and/or a programmed processor (software being executed by a processor, e.g., the processor 1112).

The processor 1112 controls the overall operation of the device 1100 by performing some or all of the operations of one or more applications or operating system programs implemented on the device 1100, by executing instructions for it (software code and data) that may be found in the storage 1108. The processor 1112 may, for example, drive the display 1122 and receive user inputs through the user input interface 1124 (which may be integrated with the display 1122 as part of a single, touch sensitive display panel). In addition, processor 1112 may send an audio signal to speaker 1118 to facilitate operation of speaker 1118.

Storage 1108 provides a relatively large amount of "permanent" data storage, using nonvolatile solid state memory (e.g., flash storage) and/or a kinetic nonvolatile storage device (e.g., rotating magnetic disk drive). Storage 1108 may include both local storage and storage space on a remote server. Storage 1108 may store data as well as software components that control and manage, at a higher level, the different functions of the device 1100.

In addition to storage 1108, there may be memory 1114, also referred to as main memory or program memory, which provides relatively fast access to stored code and data that is being executed by the processor 1112. Memory 1114 may include solid state random access memory (RAM), e.g., static RAM or dynamic RAM. There may be one or more processors, e.g., processor 1112, that run or execute various software programs, modules, or sets of instructions (e.g., applications) that, while stored permanently in the storage 1108, have been transferred to the memory 1114 for execution, to perform the various functions described above.

The device 1100 may include communications circuitry 1102. Communications circuitry 1102 may include components used for wired or wireless communications, such as two-way conversations and data transfers. For example, communications circuitry 1102 may include RF communications circuitry that is coupled to an antenna, so that the user of the device 1100 can place or receive a call through a wireless communications network. The RF communications circuitry may include a RF transceiver and a cellular baseband processor to enable the call through a cellular network. For example, communications circuitry 1102 may include Wi-Fi communications circuitry so that the user of the device 1100 may place or initiate a call using voice over Internet Protocol (VOIP) connection, transfer data through a wireless local area network.

The device may include a speaker 1118. Speaker 1118 may be a micro speaker which includes an optical sensor, such as that described in reference to FIG. 1. In this aspect, speaker 1118 may be an electric-to-acoustic transducer or sensor that converts an electrical signal input (e.g., an aocustic input) into sound. The circuitry (e.g. circuit 140) may be electrically connected to processor 1112 and power source 1110 to facilitate the speaker operations, including diaphragm displacement measurement and temperature compensation as previously discussed.

The device 1100 may include a motion sensor 1104, also referred to as an inertial sensor, that may be used to detect movement of the device 1100. The motion sensor 1104 may include a position, orientation, or movement (POM) sensor, such as an accelerometer, a gyroscope, a light sensor, an infrared (IR) sensor, a proximity sensor, a capacitive proximity sensor, an acoustic sensor, a sonic or sonar sensor, a radar sensor, an image sensor, a video sensor, a global positioning (GPS) detector, an RF or acoustic doppler detector, a compass, a magnetometer, or other like sensor. For example, the motion sensor 1104 may be a light sensor that detects movement or absence of movement of the device 1100, by detecting the intensity of ambient light or a sudden change in the intensity of ambient light. The motion sensor 1104 generates a signal based on at least one of a position, orientation, and movement of the device 1100. The signal may include the character of the motion, such as acceleration, velocity, direction, directional change, duration, amplitude, frequency, or any other characterization of movement. The processor 1112 receives the sensor signal and controls one or more operations of the device 1100 based in part on the sensor signal.

The device 1100 also includes camera circuitry 1106 that implements the digital camera functionality of the device 1100. One or more solid state image sensors are built into the device 1100, and each may be located at a focal plane of an optical system that includes a respective lens. An optical image of a scene within the camera's field of view is formed on the image sensor, and the sensor responds by capturing the scene in the form of a digital image or picture consisting of pixels that may then be stored in storage 1108. The camera circuitry 1106 may also be used to capture video images of a scene.

Device 1100 also includes primary power source 1110, such as a built in battery, as a primary power supply.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, the devices and processing steps disclosed herein may correspond to any type of transducer assembly including an optical sensor that could benefit from diaphragm displacement measurement and temperature detection, for example, a microphone. The description is thus to be regarded as illustrative instead of limiting.

What is claimed is:

1. A micro speaker assembly comprising:
   a micro speaker having a top plate, a bottom plate parallel to the top plate, a magnet assembly coupled to one of the top plate or the bottom plate, a compliant member positioned between the magnet assembly and the top plate or the bottom plate, the compliant member operable to be displaced in response to an acoustic input, and a voice coil coupled to the compliant member; and
   an optical sensor coupled to the micro speaker, the optical sensor having a light emitter and a light detector, the light emitter and the light detector being fixedly coupled to the top plate or the bottom plate, and the optical sensor being operable to produce a displacement signal corresponding to a displacement of the compliant member and a temperature signal corresponding to a temperature of the magnet assembly.

2. The micro speaker assembly of claim 1 wherein the light emitter is operable to emit light in a direction of the compliant member and the light detector is operable to detect a light reflected from the compliant member to produce the displacement signal.

3. The micro speaker assembly of claim 1 wherein the magnet assembly comprises a cavity formed therein, and the light emitter and the light detector are positioned within the cavity.

4. The micro speaker assembly of claim 1 wherein the magnet assembly, the light emitter and the light detector are coupled to the bottom plate of the micro speaker.

5. The micro speaker assembly of claim 1 wherein the magnet assembly is coupled to the bottom plate of the micro speaker, and the light emitter and the light detector are coupled to the top plate of the micro speaker.

6. The micro speaker assembly of claim 1 wherein the optical sensor is operable to detect a displacement of the compliant member within a distance range corresponding to a linear response region of the optical sensor.

7. The micro speaker assembly of claim 1 further comprising:
a circuit operable to process the displacement signal and the temperature signal output by the optical sensor.

8. The micro speaker assembly of claim 7 wherein the displacement signal corresponds to an intensity of a light detected by the light detector, and the circuit is operable to measure a displacement of the compliant member based on the intensity of the light detected.

9. The micro speaker assembly of claim 7 wherein the optical sensor is a first optical sensor and the displacement signal is a first displacement signal indicative of a displacement of a first portion of the compliant member, the micro speaker assembly further comprising a second optical sensor, wherein the second optical sensor is operable to output a second displacement signal indicative of a displacement of a second portion of the compliant member, and wherein the circuit is further operable to detect a tilt of the compliant member based on the first displacement signal and the second displacement signal.

10. The micro speaker assembly of claim 7 wherein the temperature signal corresponds to a forward voltage signal of the light emitter, and the circuit is operable to measure a temperature of the magnet assembly based on the forward voltage signal.

11. The micro speaker assembly of claim 10 wherein the circuit is further operable to modify a power input to the micro speaker based on the temperature of the magnet assembly to protect the micro speaker against overheating.

12. The micro speaker assembly of claim 10 wherein the circuit is further operable to modify a power input to the optical sensor to compensate for a change in output of the optical sensor due to the temperature of the magnet assembly.

13. An electrodynamic speaker assembly comprising:
an electrodynamic speaker having a top plate, a bottom plate parallel to the top plate, a magnet assembly coupled to one of the top plate or the bottom plate, a diaphragm positioned between the magnet assembly and the top plate or the bottom plate, the diaphragm operable to be displaced in response to an acoustic input, and a voice coil coupled to the diaphragm; and
an optical proximity sensor positioned within a cavity of the magnet assembly, the optical proximity sensor having a light emitting diode (LED) operable to emit a beam of electromagnetic radiation in a direction of the diaphragm and a light detector operable to detect a reflection of the beam of electromagnetic radiation from the diaphragm.

14. The electrodynamic speaker assembly of claim 13 wherein the LED and the light detector are fixedly positioned on the bottom plate such that they are on a same plane.

15. The electrodynamic speaker assembly of claim 13 wherein the cavity is within a center of the magnet assembly.

16. The electrodynamic speaker assembly of claim 13 wherein the optical proximity sensor is operable to detect a displacement of the diaphragm based on the reflection of the beam of electromagnetic radiation.

17. The electrodynamic speaker assembly of claim 13 wherein the optical proximity sensor is operable to detect a temperature of the magnet assembly.

18. The electrodynamic speaker assembly of claim 13 wherein the optical proximity sensor is operable to detect a tilt of the diaphragm.

19. A transducer assembly comprising:
a transducer having a magnet assembly, a compliant member suspended over the magnet assembly, the compliant member operable to be displaced in response to an acoustic input, and a voice coil coupled to the compliant member;
a reflective optical sensor coupled to the transducer, the reflective optical sensor operable to (1) detect a displacement of the compliant member by detecting a light reflected off of the compliant member and produce a corresponding displacement signal, and (2) detect a temperature of the magnet assembly and produce a corresponding temperature signal; and
a circuit operable to receive the displacement signal and the temperature signal, and measure the displacement of the compliant member and the temperature of the magnet assembly.

20. The transducer assembly of claim 19 wherein the reflective optical sensor comprises a light emitter and a light detector, and wherein the light emitter emits a beam of electromagnetic radiation toward the compliant member and the light detector detects a reflection of the beam off of the compliant member to produce the displacement signal.

21. The transducer assembly of claim 19 wherein the reflective optical sensor comprises a light emitter and a light detector, and wherein the light emitter and the light detector are positioned along a surface of the transducer that is parallel to the compliant member.

22. The transducer assembly of claim 19 wherein the reflective optical sensor is operable to detect a displacement of the compliant member within a distance range of 2 mm or less from the optical sensor.

23. The transducer assembly of claim 19 wherein the reflective optical sensor comprises a light emitting diode (LED) and a light detector positioned within a cavity of the magnet assembly.

24. The transducer assembly of claim 19 wherein the reflective optical sensor comprises a light emitting diode (LED), and the circuit measures the temperature of the magnet assembly based on a forward voltage signal of the LED.

25. The transducer assembly of claim 19 wherein the circuit is further operable to determine when the temperature of the magnet assembly is above a predetermined threshold temperature and modify a power to the transducer.

26. The transducer assembly of claim 19 wherein the circuit is further operable to modify a power to the reflective optical sensor to compensate for a change in output of the reflective optical sensor due to the temperature of the magnet assembly.

27. The transducer assembly of claim 19 wherein the circuit is further operable to detect a tilt of the compliant member based on the measured displacement of the compliant member.

28. The transducer assembly of claim 19 wherein the transducer is a micro speaker and the compliant member has a maximum displacement distance of 2 mm or less.

* * * * *